D GLOVER.
Dumping Car.
No. 24,732. 
Patented July 12, 1859.
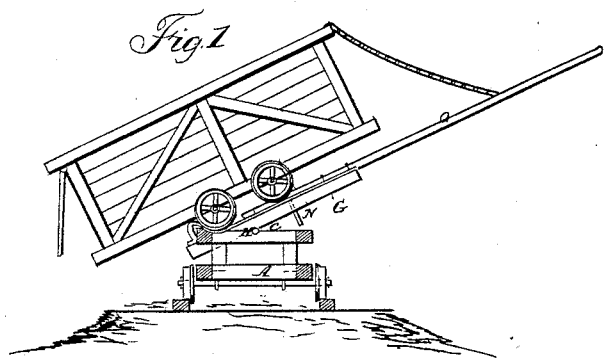
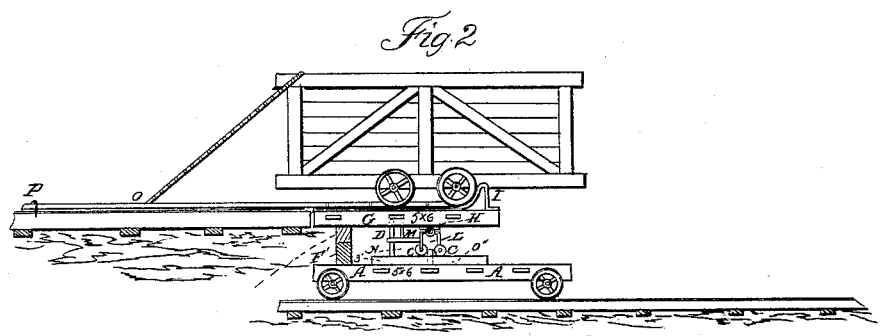
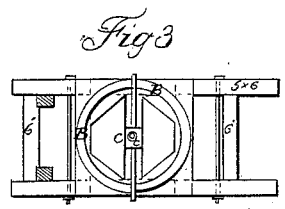
Witnesses,
Howell Fisher
Rob'A. Mainroy
Inventor:
David Glover

UNITED STATES PATENT OFFICE.

DAVID GLOVER, OF CASS TOWNSHIP, PENNSYLVANIA.

DUMPING-CAR.

Specification of Letters Patent No. 24,732, dated July 12, 1859.

*To all whom it may concern:*

Be it known that I, DAVID GLOVER, of Cass township, in the county of Schuylkill and State of Pennsylvania, have invented a new and useful Traveling Dump or Tip for Receiving, Carrying, and Dumping or Tipping Loaded Cars or Trucks; and I do hereby declare that the following is a full, clear, and exact description of the same, reference being had to the accompanying drawings, forming a part of this specification, in which—

Figure 1, is an end view of the truck, with the wagon thereon dumped or tipped. Fig. 2, is a side view of dump or tip and truck as they stand when receiving loaded wagon from main track, or the empty wagon is being taken off, and Fig. 3, a plan of the truck.

Similar letters of references, in each of the several figures indicate corresponding parts.

The nature of my invention consists in the construction of a revolving tip placed upon a movable frame or truck, the side pieces of which form, at a certain stage of the operation, a continuation of the main track or foundation, by means of which the wagon or car can be taken, without handling, from the main track or foundation with its load, moved to the place required and there dumped in any direction; thus accomplishing the discharge of the load of the car on a cheap and expeditious manner without the use of the derrick or other auxiliary means, substantially as hereinafter set forth.

To enable others, skilled in the art, to make and use my invention, I will proceed to describe its construction and operation.

In my invention, a truck A, Figs. 1 and 2, of the usual construction of four wheel trucks, without springs, is used. The floor or bed of this truck is made as in Fig. 3, having the flat ring B, of iron or wood laid firmly upon it, as seen in Fig. 3, on which when the truck is in use, run the friction wheels c, c, Fig. 2 and the supporting wheel D, Fig. 2. On this bed is also fastened the pivot plate E, Fig. 3, with a hole in the center of proper size for the insertion of a strong pin. On the rear of the truck is also placed the piece F, Fig. 2, upon which, when in line with the track, the tip rests and the wheel D, relieved of the blow given by the car or wagon when run on the tip. The tip itself is made similarly to the ordinary tip used at coal breakers; that is two rails G, Fig. 2, are connected by cross pieces so as to correspond with the width of the track, and the car when run on it is held by a projection fastened to the rails at I, Fig. 2, or the iron put upon the tip is turned up, as at I, Fig. 2. At the point H, Fig. 2, is fastened to the bottom of, and across the tip, an axle, on which it plays, or as in the tip now being described the axle is made permanent and the tip moves by means of boxes on the bottom of the rails, upon the ends of the axle. This axle is fastened permanently upon the piece L, Fig. 2, which piece by a bolt is held in place and works upon the pivot plate E, Fig. 3, at its center, and runs upon the friction wheels c, c, Fig. 2, at each end.

From the point M, Fig. 2, a piece of iron or wood projects with the end working in the supporting wheel D, Fig. 2. The projection N, Fig. 2, dropping from one of the cross pieces of the tip rests upon the piece M, Fig. 2, and gives support to the tip so as to prevent its tipping backward when for the purpose of emptying the load on the side of the bank the tip is turned round and off of the piece F, Fig. 2. The tip is worked and moved in any direction required by means of the lever O, Figs. 1 and 2, which also by the movable catch P, Fig. 2, holding it down to the level of the track prevents the tipping of the car when it is run upon the tip.

Having thus described the construction of the different parts of the movable tip I will describe its mode of application, at mines, which is as follows: Two railroad tracks on the stock, or dirt bank are required. The main track is run out to near the end of the bank or place where the coal or dirt is to be tipped where it is stopped, as seen in Fig. 2, the upper track of which is the main track. Another track somewhat wider than the upper to accommodate the necessarily increased width of the truck A, is then laid from the end of the upper track to the end of the bank. This track is first made just long enough to hold the truck A, and is placed just so far below the upper track, as will bring the rails of the tip level with the rails of the upper track so that a car from that track will run easily on the tip. This lower track as the bank increases in size is extended on and truck and tip pushed from the upper track to its end, till its length becomes inconvenient, when it is torn up, and the upper track brought out to near the end of the bank merely leaving room for the truck A, on the lower track as before, and so on from time to time as the works progress and the banks increase.

When in use, the car or wagon is run with its load upon the tip and then pushed forward on the truck to such place as desired, where the door being opened the car is thrown in the position seen in Fig. 1, by means of the lever O, Fig. 1, and its contents speedily discharged at the end of or on either side of the bank, when it is again thrown, by the lever, in position and pushed to the upper track ready for another trip. Should it be found expedient, rollers or slides may be used under the truck, instead of wheels.

I have only described my invention as used at mines: I intend, however, to extend its use to railroads, embankments and all other places where it will be found practicable and useful.

What I claim as my invention and desire to secure by Letters Patent, is—

The construction of a revolving tip placed upon a movable frame or truck, the side pieces of which form, at a certain stage of the operation, a continuation of the main track or foundation, by means of which the wagon or car can be taken, without handling, from the main track or foundation with its load, moved to the place required and there dumped in any direction, substantially as and for purposes set forth.

DAVID GLOVER.

Witnesses:
CLEMENT S. FOSTER,
ROBT. A. MAINGAY.